United States Patent
Tseng

(10) Patent No.: US 7,607,003 B2
(45) Date of Patent: Oct. 20, 2009

(54) SYSTEM AND METHOD FOR LOADING AN OPERATING SYSTEM ON A PERSONAL COMPUTER

(75) Inventor: Wei-Hsin Tseng, Sindian (TW)

(73) Assignee: Cyberlink Corp., Shindian, Taipei (TW)

( * ) Notice: Subject to any disclaimer, the term of this patent is extended or adjusted under 35 U.S.C. 154(b) by 1000 days.

(21) Appl. No.: 10/989,852

(22) Filed: Nov. 15, 2004

(65) Prior Publication Data

US 2006/0064688 A1 Mar. 23, 2006

Related U.S. Application Data

(60) Provisional application No. 60/611,876, filed on Sep. 21, 2004.

(51) Int. Cl.
*G06F 9/00* (2006.01)
*G06F 15/177* (2006.01)

(52) U.S. Cl. ............... 713/2; 713/1; 713/300; 713/320; 713/324

(58) Field of Classification Search ............ 713/1, 713/2, 300, 320, 324
See application file for complete search history.

(56) References Cited

U.S. PATENT DOCUMENTS

| | | | | |
|---|---|---|---|---|
| 6,178,503 | B1 * | 1/2001 | Madden et al. | 713/2 |
| 6,367,074 | B1 * | 4/2002 | Bates et al. | 711/170 |
| 6,502,194 | B1 * | 12/2002 | Berman et al. | 726/28 |
| 6,763,458 | B1 * | 7/2004 | Watanabe et al. | 713/100 |
| 6,839,836 | B2 * | 1/2005 | Cole et al. | 713/2 |
| 6,928,542 | B2 * | 8/2005 | Wen et al. | 713/2 |
| 7,024,549 | B1 * | 4/2006 | Luu et al. | 713/2 |
| 7,234,055 | B2 * | 6/2007 | Chiu et al. | 713/2 |
| 7,328,333 | B2 * | 2/2008 | Kawano et al. | 713/1 |
| 7,380,148 | B2 * | 5/2008 | Montero et al. | 713/324 |
| 7,395,421 | B1 * | 7/2008 | Nowlin | 713/2 |
| 7,424,623 | B2 * | 9/2008 | Du et al. | 713/300 |
| 7,430,661 | B2 * | 9/2008 | Dunn et al. | 713/2 |
| 2002/0152372 | A1 * | 10/2002 | Cole et al. | 713/2 |
| 2002/0157001 | A1 * | 10/2002 | Huang et al. | 713/2 |

(Continued)

OTHER PUBLICATIONS

InterVideo InstantON, Mar. 22, 2004, http://internetvideomag.com/News/News2004/0320_04_InterVideo.htm, pp. 1-4.*

(Continued)

*Primary Examiner*—Thomas Lee
*Assistant Examiner*—Jaweed A Abbaszadeh
(74) *Attorney, Agent, or Firm*—Thomas, Kayden, Horstemeyer & Risley

(57) ABSTRACT

Systems and methods for loading a limited-purpose operating system on a general-purpose computing device are provided. One such system includes a general-purpose computing device having a data storage system including a partition having a general-purpose and a limited-purpose operating system stored thereon. The data storage system includes machine executable code for loading the limited-purpose operating system into memory responsive to an indication that the general-purpose computing device is to be used for a limited purpose, the loading commenced under control of the general-purpose operating system. The data storage system further includes machine executable code for implementing the limited purpose, the code for implementing the limited purpose executed under control of the limited-purpose operating system. The file system for the limited-purpose operating system may be mounted in a directory on the partition or a virtual drive.

15 Claims, 3 Drawing Sheets

U.S. PATENT DOCUMENTS

| | | | |
|---|---|---|---|
| 2003/0023839 A1* | 1/2003 | Burkhardt et al. | 713/1 |
| 2003/0177367 A1* | 9/2003 | King et al. | 713/185 |
| 2004/0006690 A1* | 1/2004 | Du et al. | 713/2 |
| 2004/0073783 A1* | 4/2004 | Ritchie | 713/1 |
| 2006/0010314 A1* | 1/2006 | Xu | 713/2 |
| 2006/0047940 A1* | 3/2006 | Chiu et al. | 713/2 |
| 2008/0215871 A1* | 9/2008 | Chan | 713/2 |

OTHER PUBLICATIONS

BasicLinux 1.8, Dec. 31, 2002, http://www.volny.cz/basiclinux1/baslin18.zip.*

BasicLinux, Dec. 31, 2002, http://www.volny.cz/basiclinux1.*

Booting with Loadlin, Dec. 10, 2001, http://old.xlife.zuavra.net/columns/20011210.*

* cited by examiner

SYSTEM AND METHOD FOR LOADING AN OPERATING SYSTEM ON A PERSONAL COMPUTER

CROSS REFERENCE TO RELATED APPLICATIONS

This application claims priority to U.S. Provisional Application entitled, "SYSTEM AND METHOD FOR LOADING AN OPERATING SYSTEM ON A PERSONAL COMPUTER," having Ser. No. 60/611,876, filed on Sep. 21, 2004, which is entirely incorporated by reference.

FIELD OF THE INVENTION

The present invention relates to systems and methods for loading operating systems on a personal computer and more specifically, to a computing device designed to load an operating system having limited functionality upon instruction from a user.

BACKGROUND

General-purpose computing devices such as, but not limited to, laptop and desktop computers, include the capability of a wide range of powerful computing capabilities. Unlike general-purpose computing devices, application-specific electronic devices, such as digital-audio players (e.g. MP3), Digital Versatile Disc (DVD) players, and electronic word processors, typically provide a limited subset of computing capabilities. However, despite their incapability to provide the vast features of a general-purpose computing device, application-specific electronic devices sometimes have advantages primarily due to their inherent simplicity.

For example, the simplicity of an application-specific electronic device is one reason why the devices typically quickly power-on to a usable state. For example, a home DVD player may be powered on and become ready to play a DVD in a matter of seconds. Furthermore, because application-specific electronic devices, by definition, do not perform a large number of tasks, their simplicity often translates to more reliable use. Specifically, application-specific electronic devices are typically unencumbered from conflicts and glitches that may be introduced into the environment of the general-purpose computing device from the numerous drivers and software applications which interact to provide the vast array of computing services.

Despite the wide-ranging capabilities of general-purpose computing devices, it is increasingly common for these computing devices to be used for limited-purpose applications during some computing sessions. When travelling, for example, a user may use the general-purpose computing device to function primarily as a multimedia player such as a portable digital-audio player or DVD player, without the need for other office applications such as word processors and spreadsheet applications.

However, there are a number of potential disadvantages to using a general-purpose computing device to perform under conditions in which only a limited subset of functionality is needed. For example, general-purpose computing devices, such as a laptop computer, may suffer from a lack of ability to quickly power-up and boot to a usable state. Rather, a general-purpose computing device typically executes a lengthy boot-up process that loads a multitude of drivers and other software. For the computing sessions in which the general-purpose computing device is used for a limited purpose, this lengthy boot-up process is cumbersome and unnecessary for the majority of the limited functions that will be used.

There are a number of current solutions which may alleviate several of the drawbacks to booting a general-purpose computing device for a limited-purpose application. First, a user may leave the computing device running at all times such that all capabilities provided by the general-purpose computing device are provided at all times. However, this approach wastes energy since the computing device must remain powered on at all times. This is particularly disadvantageous when the general-purpose computing device is a portable computer being used away from a power source, as frequently occurs when travelling. Additionally, the complexity of the operating system and potential for system conflicts remains the same, despite the limited-purpose use.

Another solution includes the use of a "hibernate" or a "standby" mode. Using this approach, instead of completely shutting down the computer, the computing device shuts down most power consuming functions, and is able to restore itself to normal operation within a few moments. However, while each of these modes may power-on to a usable state more quickly than a fresh reboot, the modes are still comparatively slow. Furthermore, in the case of standby mode, the system may still be required to consume power. Additionally, the complexity of the operating system and potential for conflicts remains the same, despite the limited use.

Another potential solution that may alleviate a number of the drawbacks to using a general-purpose computing device for a limited purpose includes loading a limited-feature OS by selecting an alternative operating system stored in flash ROM dedicated to the particular purpose, or by using an alternative BIOS as described in U.S. Pat. No. 6,765,788 to Wu. However, each of these approaches is expensive, and the required hardware is difficult to upgrade in the future. Furthermore, this approach requires a change in hardware design of the entire computing device.

Another possible solution is installing a limited-feature operating system and any needed software in a storage partition separate from the partition used by the main, general-purpose operating system. However, in most cases, users do not have a free partition and/or additional unpartitioned storage space for this purpose. Furthermore, this solution may be technically difficult for most users to implement. Software, such as Norton PartitionMagic™ from Symantec Corporation, Cupertino, Calif., may be used to split an existing partition into multiple partitions. However, if an existing partition is split, a portion of the storage space on the original partition must be used for the at least one new partition which will hold the limited-feature operating system and software.

For at least the foregoing reasons, there is a need for a system and method for loading a limited-purpose operating system that quickly boots to a usable state, does not consume additional power, is low in cost, does not require a change to the hardware design of the general-purpose computer, allows for easy upgrading of the limited-purpose operating system, does not require decreasing the size of an existing partition, and provides ease of use to an end user.

BRIEF DESCRIPTION OF THE DRAWINGS

The components in the drawings are not necessarily to scale relative to each other. Like reference numerals designate corresponding parts throughout the several views.

SUMMARY

Figure 1:
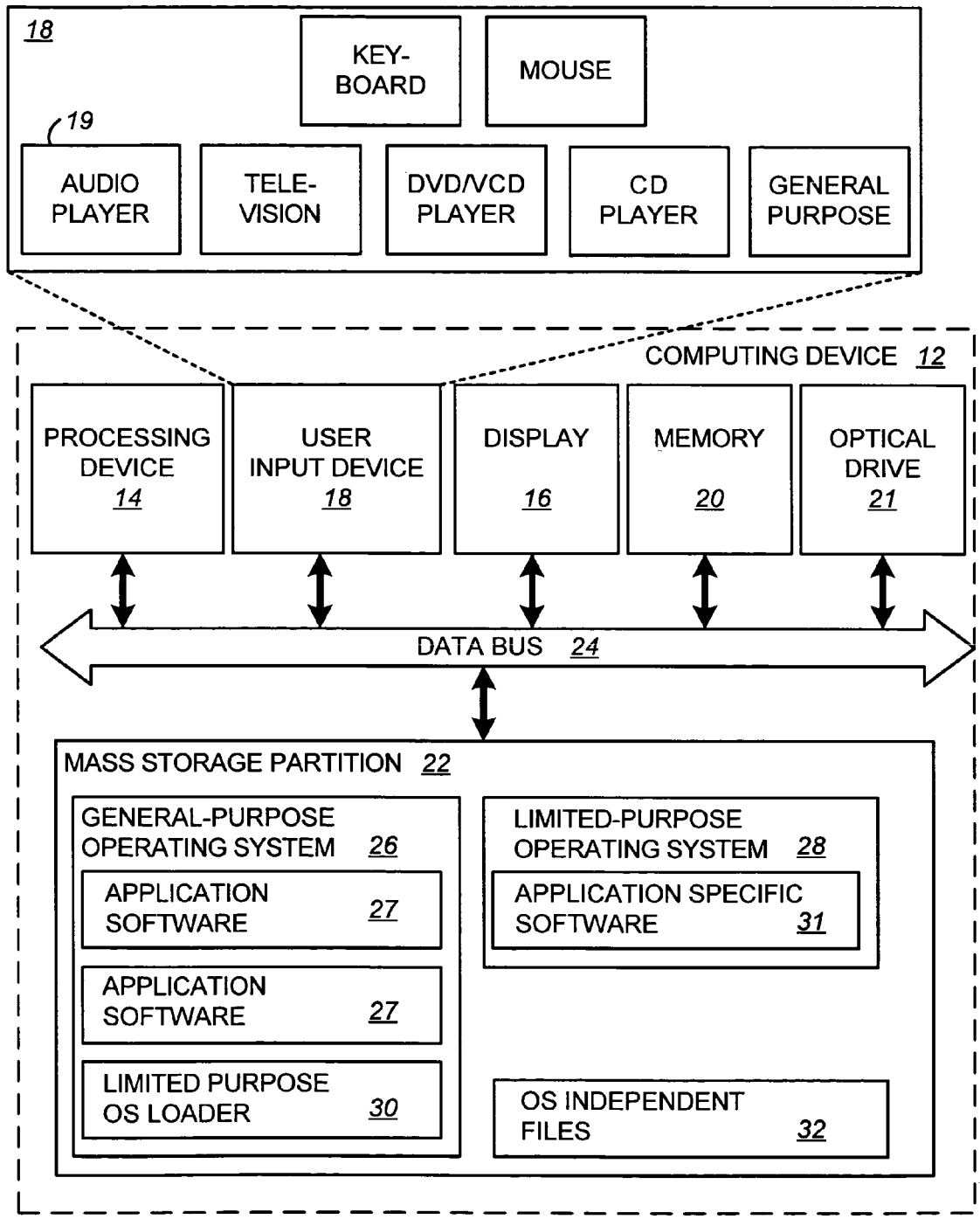
FIG. 1 is a block diagram illustrating an exemplary embodiment of a general-purpose computing device on which the described systems and methods for booting the general-purpose computing device with a limited-purpose operating system may be executed.

Systems and methods for loading an operating system on a personal computer are provided.

One embodiment of a general-purpose computing device includes a data storage system including a partition having a general-purpose and a limited-purpose operating system stored thereon. The data storage system includes machine executable code for loading the limited-purpose operating system into memory responsive to an indication that the general-purpose computing device is to be used for a limited purpose. The loading is commenced under control of the general-purpose operating system. The data storage system further includes machine executable code for mounting the limited-purpose operating system in a virtual drive residing within the memory. The virtual drive stores the limited-purpose operating system and executable code for providing the limited-purpose. The code for providing the limited-purpose is executed under control of the limited-purpose operating system and is configured for digital multimedia playback.

Another embodiment of a general-purpose computing device comprises a data storage system including a partition having a general-purpose and a limited-purpose operating system stored thereon. The limited-purpose operating system is configured to provide the general-purpose computing device with restricted capabilities. The data storage system includes machine executable code for loading the limited-purpose operating system into memory responsive to an indication that the general-purpose computing device is to be used for a limited purpose. The loading is commenced under control of the general-purpose operating system. The data storage system further includes machine executable code for implementing the limited purpose. The code for implementing the limited purpose is executed under control of the limited-purpose operating system.

An embodiment of a method for loading a limited-purpose operating system on a general-purpose computing device includes storing a general-purpose and a limited-purpose operating system within a partition on a data storage system. The limited-purpose operating system is configured to provide the general-purpose computing device with restricted capabilities. The method further includes loading the limited-purpose operating system into memory responsive to an indication that the general-purpose computing device is to be used for a limited purpose, and the loading is commenced under control of the general-purpose operating system. The method further includes loading an application implementing the limited purpose into memory, the application implementing the limited purpose executed under control of the limited-purpose operating system.

Other systems, methods, features and/or advantages will be or may become apparent to one with skill in the art upon examination of the following drawings and detailed description. It is intended that all such additional systems, methods, features and/or advantages be included within this description

DETAILED DESCRIPTION

The described systems and methods for loading an operating system on a personal computer are useful for booting a general-purpose computing device with a limited-purpose operating system. The systems and methods facilitate the use of the general-purpose computing device for use as an application-specific (e.g. limited-purpose) device. For example, a general-purpose computing device, such as a laptop or personal computer, may be configured to load an operating system and software useful for a limited-purpose, such as playback of multimedia (e.g. digital-audio, compact discs, digital-video, or DVD or VCD movie playback). Other limited-purpose uses may include, but are not limited to: personal-information management (e.g. calendar management, task management, contact management, etc.), storage of multimedia files (e.g. from a camera), calculator functions, digital camera functions, portable communications, time keeping (e.g. clocks), and video games.

FIG. 1 is a block diagram illustrating an exemplary embodiment of a general-purpose computing device 12 on which the described systems and methods for booting a general-purpose computing device with a limited-purpose operating system may be executed. Generally speaking, computing device 12 can comprise any one of a wide variety of wired and/or wireless computing devices, such as a desktop computer, portable computer, laptop computer, dedicated server computer, multiprocessor computing device, handheld or pen based computer, and so forth. Irrespective of its specific arrangement, computing device 12 can, for instance, comprise memory 20, a processing device 14, a display 16, a user input device 18, and at least one mass storage partition 22, wherein each of these devices are connected across a data bus 24. The computing device 12 may further include other peripherals such as, but not limited to, printers (not shown), speakers (not shown), and an optical drive 21. Optical drive 21, for example, may be a CD or DVD drive which could be used for CD or DVD playback. The user input device 18 may be a keyboard, mouse, or a plurality of manually-depressible input buttons 19, for example. Memory 20, may be used to store a number of executable modules such as those executing the methods described herein. Display 16 can comprise a computer monitor or a plasma screen for a PC or a liquid crystal display (LCD) on a hand-held device, for example.

Processing device 14 can include any custom made or commercially available processor, a central processing unit (CPU) or an auxiliary processor among several processors associated with the computing device 12, a semiconductor based microprocessor (in the form of a microchip), a macro-processor, one or more application-specific integrated circuits (ASICs), a plurality of suitably configured digital logic gates, and other well known electrical configurations comprising discrete elements, both individually, and in various combinations to coordinate the overall operation of the computing system.

The memory 20 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 20, during operation, typically comprises a native operating system 26, one or more native applications 27, emulation systems, or emulated applications for any of a variety of operating systems and/or emulated hardware platforms, emulated operating systems, etc. For example, the applications may include application-specific software, which may include executable modules for multimedia file playback or performing word processing tasks, for example.

One of ordinary skill in the art will appreciate that memory 20 can, and typically will, comprise other components which have been omitted for purposes of brevity.

Mass storage partition 22 may include general-purpose operating system 26 and a number of drivers, files, various application software 27 capable of being run and/or used under the control of general-purpose operating system 26. For example, general-purpose operating system 26 may have a number of applications and drivers required for word processing, spreadsheet manipulation, photo manipulation, printing, networking, etc. In addition, an operating-system loader 30 for a limited-purpose operating system may also be stored in storage partition 22, and operating-system loader 30 may also be executed under control of the general-purpose operating system 26. Storage partition 22 may also include operating-system independent files 32 such as, but not limited to, executable files, configuration files, and other data on the storage partition which may be used by, or under the control of, both the general-purpose and limited-purpose operating systems.

According to one embodiment of the system, a limited-purpose operating system 28 is stored into the primary, general-purpose operating system storage partition 22 of the computing device 12. The limited-purpose operating system may be stored as an image within a directory on the partition. The image may also include any data, executable files, and/or application specific software 31 needed to perform the specific purpose. In an embodiment, the image may be an image file stored on partition 22.

The primary, general-purpose operating system 26 may include, but is not limited to, the DOS, WINDOWS 95, WINDOWS 98, WINDOWS 2000, WINDOWS ME, or WINDOWS XP operating systems available from Microsoft Corporation. Limited-purpose operating system 28 may be any one of a number of operating systems such as, but not limited to, Linux, BeOS, or Windows 95, 98, ME, or XP. The files required to execute a specific application may include the necessary drivers (e.g. for a CD drive, DVD drive, and/or an appropriate display device) and application specific software 31. Application specific software 31, for example, may be designed for multimedia playback. Exemplary multimedia playback software may, for example, include the multimedia playback software PowerDVD by Cyberlink USA, Freemont, Calif.

The operating system loader for the limited-purpose operating system is configured to load and start the limited-purpose operating system upon detecting an indication that the general-purpose computing device is to be used for a limited purpose.

The general-purpose computing device commences loading and starting of the limited-purpose operating system upon detecting an indication that the general-purpose computing device is to be used for a limited purpose. This indication may be provided in any number of ways, including, but not limited to, receiving a selection of a menu driven option, detecting a key sequence, or detecting that a manually depressible button 19 on the general-purpose computing device has been pressed. For example, these indications may be detected during boot-up of the computing device.

For example, in one embodiment, a menu option may be provided to the user which asks whether the general-purpose operating system, or if the limited-purpose operating system and related files should be loaded. This menu, for example, could be provided to the user at boot-up or shut-down. The menu could also provide further selections for numerous limited-purpose computing configurations. For example, the menu could provide a selection between the general-purpose operating system and a limited-purpose operating system with related files for a specific purpose, such as DVD playback, providing a calculator, or playing a game.

In the case that the general-purpose operating system is selected to be loaded, the normal boot process resumes and the general-purpose computing device is available for all normal computing functions. However, in the case that the limited-purpose operating system and related files are selected, the operating system loader for the limited-purpose operating system is executed. Accordingly, preferably, only the minimum files required to run the limited-purpose operating system and the related files for the application-specific function are loaded during boot-up. Once the limited-purpose operating system is loaded, the limited-purpose applications (e.g. multimedia playback software) may be executed.

In one embodiment, at least one manually depressible button 19 representing a limited-purpose function may be provided on the exterior of the general-purpose computing device. The button(s) may further be configured such that the general-purpose computing device is booted with the limited-purpose operating system and related files associated with that button. For example, a button having the indicia "Audio Player" may be provided on the keyboard or case of the computing device. Alternatively, a key or button sequence on an existing input device such as a keyboard or mouse may be depressed. By depressing this key-sequence, button sequence, and/or button(s) 19, the general-purpose computing device is instructed to boot having only the limited-purpose operating system and the supporting application files to perform the limited function.

To boot the limited-purpose operating system 28, operating system loader 30 for the limited-purpose operating system 28 is executed under the general-purpose operating system 26. The boot code of the general-purpose operating system may be configured to execute the operating system loader for the limited-purpose operating system. For example, under Windows XP, the boot.ini may be modified to run the operating system loader. Likewise, under Windows 98 or ME, for example, the config.sys may be updated to execute the operating system loader.

One example of an operating system loader is "LOADLIN." LOADLIN is an open-source utility that runs in DOS but boots the Linux operating system. Detailed information about LOADLIN v1.6 may be found in the "LOADLIN User Guide," dated 04-26, 1996, at the Internet website: http://elserv.ffm.fgan.de/~lermen/manual.txt, the text of which is herein incorporated by reference.

Essentially, LOADLIN starts a "logical reload" of the operating system of the general-purpose computing device. Accordingly, even though the system originally begins to boot to DOS, upon execution of LOADLIN, Linux is booted in its place. To return the computing device 12 to be operated under DOS, the Linux reboot command may be used. It should be understood that, in this example, the general-purpose operating system is DOS, and the limited-purpose operating system, loaded by the loader LOADLIN, is Linux.

While some embodiments described herein use Windows XP or DOS as the exemplary general-purpose operating system and Linux as the exemplary limited-purpose operating system, the claimed systems and methods are not intended to be limited to any specific operating systems. In some embodiments, both the general-purpose operating system and the limited-purpose operating system could be the same. However, the limited-purpose operating system and supporting files are not configured to provide the scope of general-purpose functions that the general-purpose operating system is configured to provide.

For example, in the case of a system in which the limited-purpose operating system and supporting files are for the limited-purpose of digital multimedia playback, the limited-purpose operating system may not include drivers required to operate peripheral devices other than those required to play the multimedia.

Figure 2:
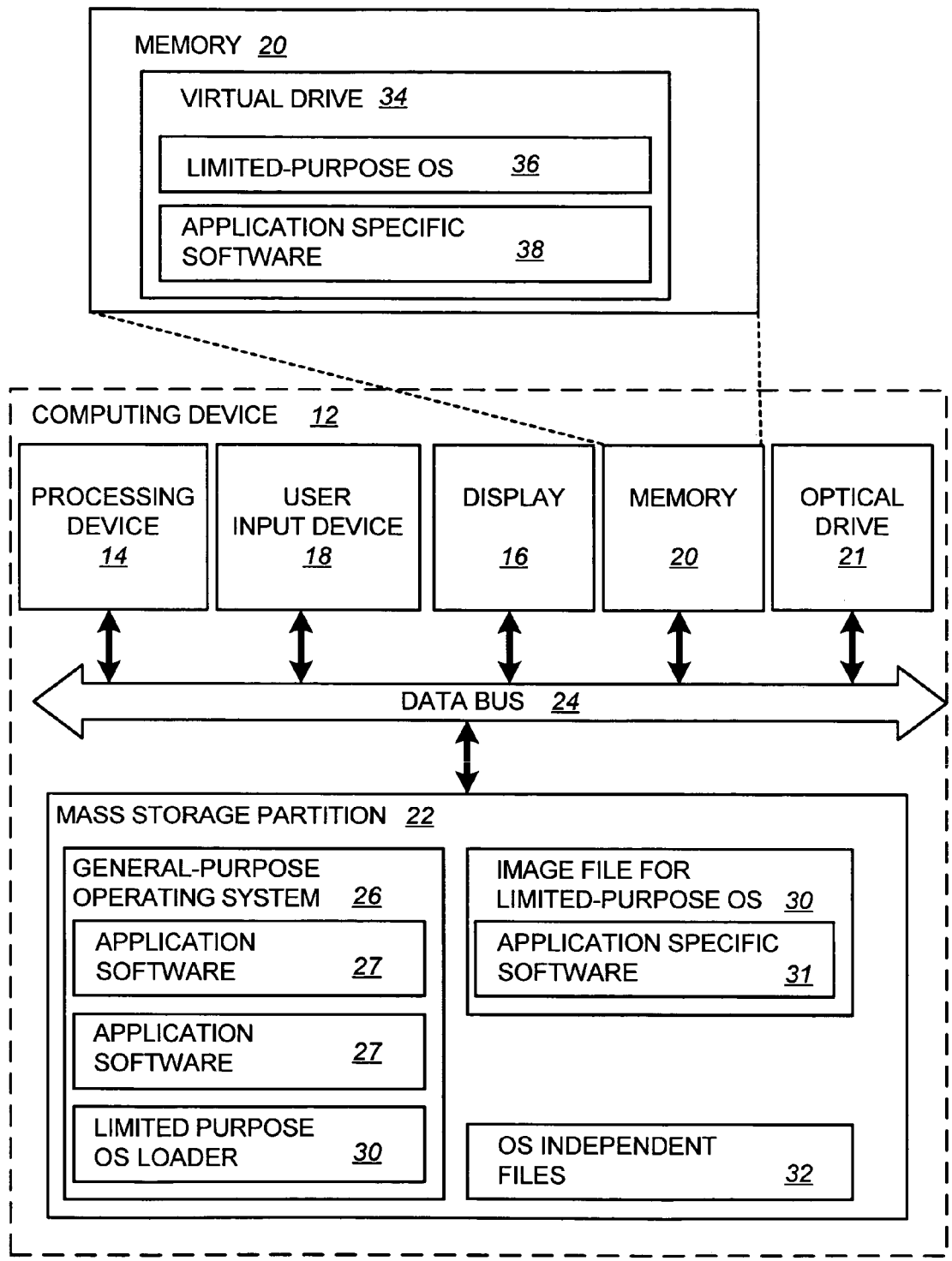
FIG. 2 is a block diagram illustrating another exemplary embodiment of the general-purpose computing device of FIG. 1, further comprising a virtual drive from which the limited-purpose operating system may operate.

In one embodiment, as shown in FIG. 2, the loader may load a virtual drive 34 (e.g. a ramdisk or loopback filesystem) with an instance of the limited-purpose operating system 36 from an image file 30. The limited-purpose operating system may then mount virtual drive 34 (e.g./dev/ram) as a root filesystem for the operating system. In addition to containing the instance of the limited-purpose operating system 36, virtual drive 34 may further be loaded with any needed drivers, files, executables, and instances of any needed application specific software 38. In one embodiment, the operating system loader may mount the filesystem for the limited-purpose operating system in a directory (e.g. root directory C:\), which may be on a local storage device (e.g. partition 22) or a networked storage device.

In some embodiments, supporting files, such as applications and/or data files for performing the limited function, may be compatible with both the general-purpose operating system and the limited-purpose operating system. In this case, the limited-purpose operating system may use these operating-system independent files 32, such as, but not limited to executable files, configuration files, and other data on the storage partition (normally used by the general-purpose operating system) to implement the limited-purpose capability, thereby alleviating the need to store multiple versions of the executable files, configuration files, and other data.

Figure 3:
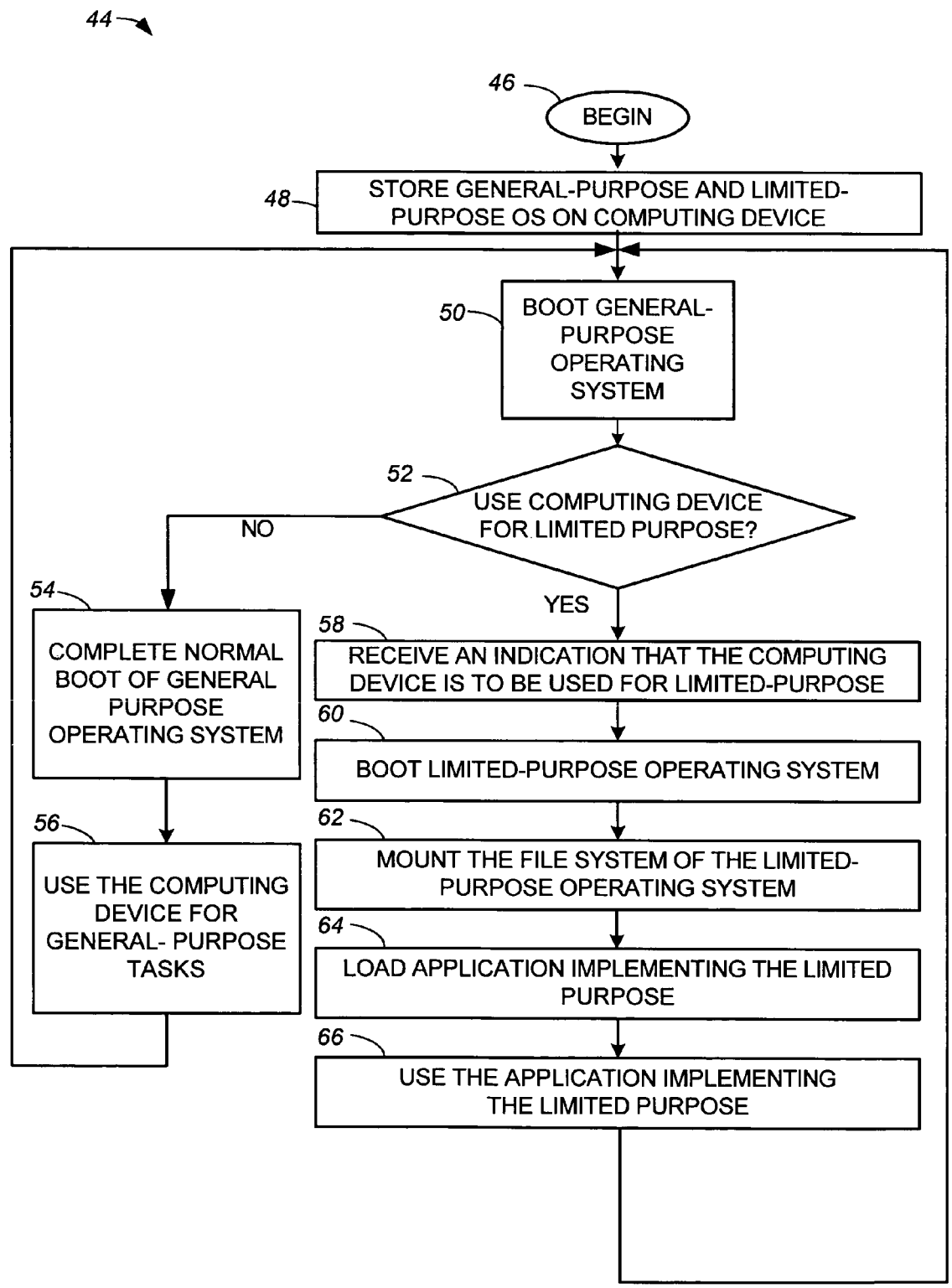
FIG. 3 is a flow diagram illustrating an exemplary embodiment of a method for loading a limited-purpose operating system on the general-purpose computing device of FIGS. 1 and 2.

FIG. 3 depicts an exemplary flow diagram 44 for a method for loading a limited-purpose operating system on a general-purpose computing device. At start step 46, a general-purpose computing device is provided. At step 48, a general-purpose and a limited-purpose operating system are stored within a partition on a data storage system of the general-purpose computing device. The limited-purpose operating system is configured to provide the general-purpose computing device with restricted capabilities (e.g. multimedia playback).

In one embodiment, the limited-purpose operating system may be stored within an image on the partition, and the limited-purpose operating system stored in the image may enable the general-purpose computer to perform only the capabilities defined by the limited purpose. A limited-purpose application implementing the limited purpose may also be stored within the image.

At step 50, the general-purpose operating system is booted, at least partially. At decision 52, the computing device (e.g. via the general-purpose operating system) may detect whether the general-purpose computing device is to be used for a specific-purpose or a general purpose.

For example, at step 58 the general-purpose computer receives an indication that the general-purpose computing device is to be used for a limited purpose. This indication may include any of receiving a selection of a menu driven option, detecting a predetermined key sequence during boot-up of the computing device, or detecting that a particular manually depressible button on the general-purpose computing device has been pressed.

In an embodiment in which a menu driven option is used, a menu may appear, preferably during the initial stages of the boot-up of the general-purpose operating system, asking the user whether to continue booting the general-purpose operating system, or to boot the limited-purpose operating system in its place. For example, if the general-purpose operating system is DOS, the limited-purpose operating system is Linux, and the boot loader for the limited-purpose operating system is LOADLIN, then the config.sys (for DOS) may be edited to read:

```
SWITCHES=/F
[MENU]
menuitem=DOS, DOS boot
menuitem=LINUX_1, LINUX boot—DVD Player Support
[DOS]
device=c:\dos\himem.sys
device=c:\dos\emm386.exe 2048 ram
DOS=HIGH,UMB
SHELL=C:\COMMAND.COM C:\/e:1024/p
[LINUX_1]
shell=c:\loadlin\loadlin.exe c:\loadlin\zimage root=/dev/hdb2 ro
```

This config.sys entry pauses the computer at the appropriate stage of the DOS boot and presents menu options of "DOS boot" or "LINUX boot—DVD Player Support" for a user's selection. The menu may be further configured to have differing menu options. For example, several different versions of the limited-purpose operating system may be loaded which provide support for differing applications. In one embodiment, for example, an additional menu option may be presented which loads only the functionality necessary for playback of compact discs, a calculator, or a computer game.

The "DOS boot" selection continues the normal boot of DOS at step 54, which, for example, provides all the applications and supporting drivers and necessary files for the general-purpose computing device. For example, word-processors, spreadsheets, calculators, drawing software, virus protection, email applications and the enablement of all useful drivers for devices such as a monitor, keyboard, mouse, hard drive, floppy drive, CD drive, DVD drive, network hardware, etc. may be loaded. At step 56, the general-purpose computing device may be used for general-purpose computing tasks.

In this example, the "LINUX boot—DVD Player Support" selection stops the normal load of DOS, and (at step 60) boots, and therefore reloads, the general-purpose computing device with a preconfigured, limited-purpose load of LINUX which provides support for DVD playback. For example, the load may provide, but is not limited to, all the supporting drivers and necessary files for the general-purpose computing device to use an attached or integral DVD player, a display for watching the video, a sound device for listening to the audio, and any necessary input devices. Input devices may be the keyboard, mouse, or a remote control operated through an attached infrared receiver port, for example.

However, the exemplary limited-purpose Linux operating system load preferably does not include supporting drivers, files, or applications used to control features of the general-purpose computing device that are not necessary for operation of the DVD playback function (the limited purpose). For example, it is typically not necessary for the general-purpose computing device to use network hardware during the limited-use of DVD playback. Hence, in this example, the supporting drivers, files, or applications for the network hardware are preferably not included in the limited-purpose operating system, or loaded upon start up of the limited-purpose operating system. Thus, boot up of the general-purpose computing device using the limited-purpose operating system may be dramatically faster than boot up of the general-purpose operating system. Furthermore, the complexity of the system may be kept to a minimum when using the general-purpose computing device for a limited purpose.

At step 62, the file system for the limited-purpose operating system may, for example, be mounted into a directory on a usable partition of the storage device, or within a virtual drive residing within memory. At step 64, an application implementing the limited purpose (e.g. executable code for DVD playback) is loaded into memory. It should be understood that because the general-purpose operating system is no longer loaded, the code for implementing the limited purpose is executed under control of the limited-purpose operating system. Thus, this method is different from mere emulation of application software by the general-purpose computing device using the general-purpose operating system, which typically involves fully booting the general-purpose operating system.

Once the limited-purpose operating system and the necessary files and applications used for implementing the limited purpose are loaded, the general-purpose computing device may be used for the limited-purpose. While the present example of the limited purpose is DVD playback, the limited purpose could be any number of limited purposes which a general-purpose computer is often used. For example, the limited purpose may include the playback of any digital multimedia including playback of digital audio, playback of digital video, playback of an audio compact disc (CD), and playback of a digital versatile disc (DVD).

Accordingly, systems and methods have been described which provide limited-purpose functionality for general-purpose computing devices. One potential advantage of the systems and methods described herein is the quick loading of the operating system and files needed to use the general-purpose computing device for the particular limited-purpose. This quick loading provides a near "instant-on" effect, and prevents the user from having to wait through a potentially lengthy boot-up process. Furthermore, by loading only a limited-purpose operating system and applications specific to that limited-purpose, the complexity of the system and associated likelihood of system conflicts is reduced.

The described systems and methods do not require costly hardware redesigns of general-purpose computing devices. Furthermore, the system allows for easy upgrades by simply updating the image file containing the limited-purpose operating system and/or related application files. The systems and methods do not require the process of adding new storage partitions. Accordingly, the installation and use of the described systems and methods are relatively simple compared to other approaches which require creating new storage partitions and complex configuration.

It should be emphasized that many variations and modifications may be made to the above-described embodiments. All such modifications and variations are intended to be included herein within the scope of this disclosure.

What is claimed is:

1. A general-purpose computing device comprising:
   a data storage system including a partition having a general-purpose and a limited-purpose operating system stored thereon, the data storage system further comprising:
   machine executable code for loading the limited-purpose operating system into memory responsive to an indication that the general-purpose computing device is to be used for a limited purpose, the loading commenced under control of the general-purpose operating system;
   machine executable code for mounting a file system of the limited-purpose operating system in a directory residing within the partition, code for providing the limited-purpose executed under control of the limited-purpose operating system and configured for digital multimedia playback; and
   at least one manually depressible button for booting the limited-purpose operating system and executing the code for implementing the limited purpose.

2. The computing device of claim 1, wherein the digital multimedia playback may be any one of: playback of digital audio, playback of digital video, playback of an audio compact disc (CD), and playback of a digital versatile disc (DVD).

3. A general-purpose computing device comprising:
   a data storage system including a partition having a general-purpose and a limited-purpose operating system stored thereon, the limited-purpose operating system configured to provide the general-purpose computing device with restricted capabilities, the data storage system further comprising:
   machine executable code for loading the limited-purpose operating system into memory responsive to an indication that the general-purpose computing device is to be used for a limited purpose, the loading commenced under control of the general-purpose operating system;
   machine executable code for implementing the limited purpose, the code for implementing the limited purpose executed under control of the limited-purpose operating system;
   machine executable code for mounting a file system of the limited-purpose operating system in a directory residing within the partition; and
   at least one manually depressible button for booting the limited-purpose operating system and executing the code for implementing the limited purpose.

4. The computing device of claim 3, wherein the machine executable code for implementing the limited purpose includes machine executable code for digital multimedia playback.

5. The computing device of claim 4, wherein the machine executable code for digital multimedia playback is configured to provide playback of any one of: playback of digital audio, playback of digital video, playback of an audio compact disc (CD), and playback of a digital versatile disc (DVD).

6. The computing device of claim 3, wherein the limited-purpose operating system is stored in the partition within an image.

7. The computing device of claim 6, wherein the image having the limited-purpose operating system is preconfigured to enable the general-purpose computer to perform only the capabilities defined by the limited purpose.

8. The computing device of claim 3, wherein the limited-purpose operating system is limited to providing the general-purpose computer with the functionality required to enable the limited-purpose.

9. The computing device of claim 3, wherein the indication that the general-purpose computing device is to be used for a limited purpose includes: a menu driven selection, a key sequence during boot-up of the general-purpose operating system, or a manually depressible button on the computing device.

10. A method for loading a limited-purpose operating system on a general-purpose computing device including:
    storing a general-purpose and a limited-purpose operating system within a partition on a data storage system, the limited-purpose operating system configured to provide the general-purpose computing device with restricted capabilities;
    loading the limited-purpose operating system into memory responsive to an indication that the general-purpose computing device is to be used for a limited purpose, the loading commenced under control of the general-purpose operating system, the indication provided by at least one manually depressible button on the general-purpose computing device;

mounting a file system of the limited-purpose operating system in a directory residing within the partition; and loading an application implementing the limited purpose into memory, the application implementing the limited purpose executed under control of the limited-purpose operating system.

11. The method of claim 10, wherein the step of implementing the limited purpose includes playback of digital multimedia.

12. The method of claim 11, wherein the playback of digital multimedia comprises any one of: playback of digital audio, playback of digital video, playback of an audio compact disc (CD), and playback of a digital versatile disc (DVD).

13. The method of claim 10, further comprising:
storing the limited-purpose operating system within an image in the partition.

14. The method of claim 13, further comprising:
preconfiguring the limited-purpose operating system stored in the image to enable the general-purpose computer to perform only the capabilities defined by the limited purpose.

15. The method of claim 10, wherein the limited-purpose operating system is limited to providing the general-purpose computer with the functionality required to enable the limited-purpose.

* * * * *